United States Patent [19]

Cummings, deceased et al.

[11] Patent Number: 4,565,215

[45] Date of Patent: Jan. 21, 1986

[54] CHEMICAL INJECTION VALVE

[76] Inventors: Leslie L. Cummings, deceased, late of Houston, Tex.; by Mildred Cummings, executrix, 4018 West Alabama, Houston, Tex. 77027

[21] Appl. No.: 612,999

[22] Filed: May 21, 1984

Related U.S. Application Data

[63] Continuation of Ser. No. 366,361, Apr. 7, 1982, abandoned, which is a continuation of Ser. No. 169,634, Jul. 16, 1980, abandoned.

[51] Int. Cl.$^4$ ............................................. F16K 15/00
[52] U.S. Cl. ................................... 137/538; 137/540; 137/155
[58] Field of Search ................... 137/155, 538, 516.15, 137/540

[56] References Cited

U.S. PATENT DOCUMENTS

| | | | |
|---|---|---|---|
| 1,781,824 | 11/1930 | Smith | 137/155 X |
| 2,225,880 | 12/1940 | Montelius | 137/538 X |
| 3,103,950 | 9/1963 | Gulick | 137/538 X |
| 3,366,138 | 1/1968 | Graham | 137/538 |
| 3,474,859 | 10/1969 | Chenoweth | 166/320 X |
| 3,559,671 | 2/1971 | Douglas | 137/155 |
| 3,993,129 | 11/1976 | Watkins | 166/319 |
| 4,256,137 | 3/1981 | de Launay | 137/538 X |

*Primary Examiner*—Alan Cohan
*Attorney, Agent, or Firm*—Vaden, Eickenroht, Thompson & Jamison

[57] ABSTRACT

A chemical injection valve, for use with either an outside mount or side pocket mount gas lift mandrel for injecting chemicals, hot oil and the like into production tubing. The valve has a tubular housing with fluid inlet ports and fluid outlet means with a longitudinal bore connecting the inlet ports and the fluid outlet means. A biased valve metering member is positioned in the bore between the fluid entry port and the fluid outlet means to regulate the flow of fluids therebetween. A fluid by-pass is provided in the housing which is opened and closed by the biased valve metering member in response to the greater to the pressure of fluid entering the fluid entry port or biasing means acting on said valve metering member. When opened, the by-pass provides fluid communication between the fluid entry ports and the fluid outlet means. The biasing means is a spring having a predetermined spring force. Means are provided for adjusting the spring force.

5 Claims, 6 Drawing Figures

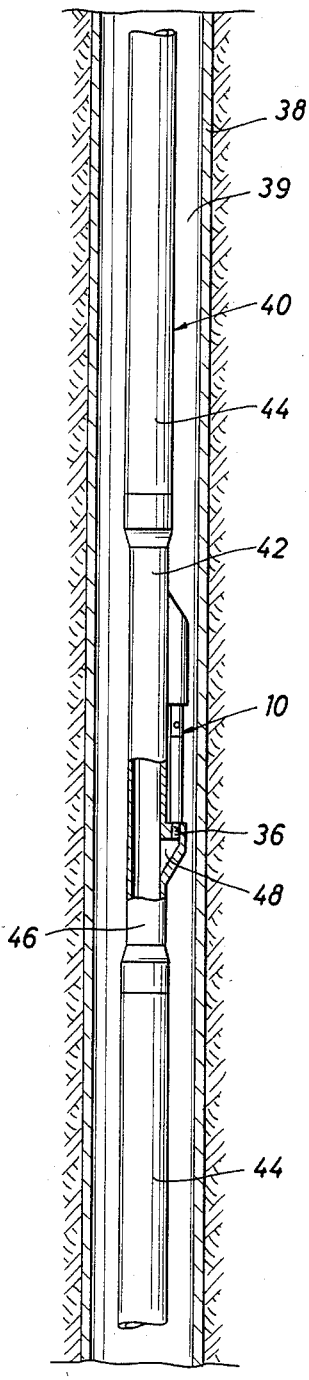
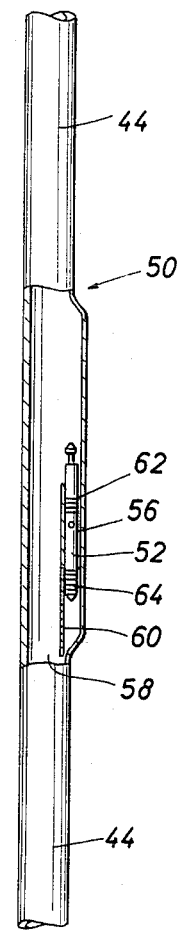
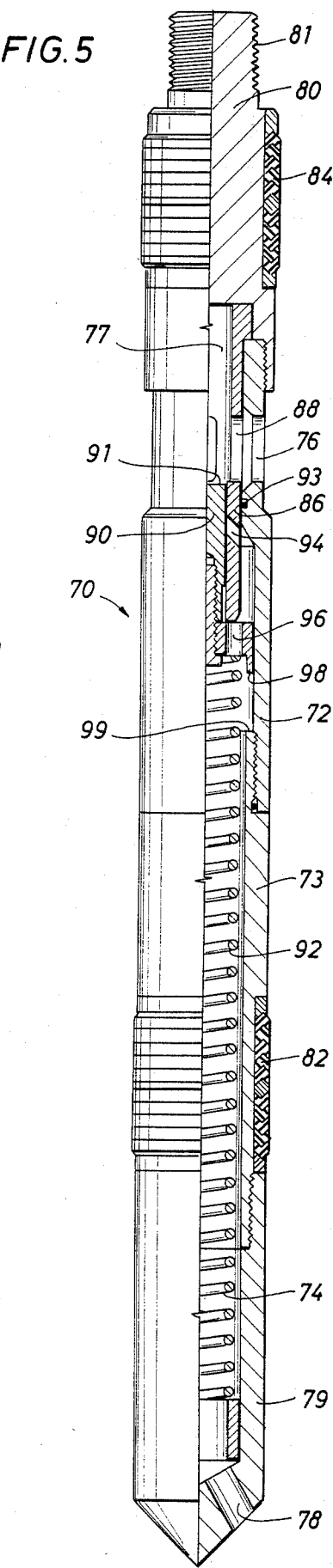

CHEMICAL INJECTION VALVE

This application is a continuation of application Ser. No. 366,361, filed Apr. 7, 1982, now abandoned, which is a continuation of U.S. Ser. No. 169,634, filed July 16, 1980 now abandoned.

BACKGROUND OF THE INVENTION

1. Field of the Invention

The invention is directed to a chemical injection valve for regulating the flow of chemicals or other fluids from the exterior of well tubing to the interior thereof.

2. Prior Art

It is sometimes necessary to treat wells by injecting into the production tubing certain chemicals, fluids and/or hot oil. Hot oil is used to melt paraffin that has built up on the walls of the tubing.

In order to introduce these fluids into the production tubing it is common to flow the fluids into the casing-tubing annulus and meter the treating fluid into the tubing through some valve device attached to the tubing. The point of fluid entry is commonly a mandrel, connected in the tubing string, onto which is attached some fluid regulating device. Typical of the mandrels useful for this purpose is the Type B conventional gas lift mandrel manufactured by Otis Engineering Corporation, illustrated in their Gas Lift Equipment and Services catalogue OEC-5122b, page 28. A currently used chemical injection valve manufactured by Otis Engineering Corporation is their "NCV" valve, having assembly number 221 NCV 1001. This valve is a spring loaded ball valve connectible to the Type B conventional gas lift mandrel.

As a rule, chemical injection valves used currently have a metal to metal abutment type valve and valve seat. Pressure differentials between opening and closing of the valve against the seat usually cause dumping of the fluid being injected. As a consequence, it is difficult to obtain a true metering of injected chemicals. For proper treating of wells, using a chemical injection valve, it is desirable to have a rather constant, metered flow of injection fluid.

It has been a goal of the industry to have a single injection valve that can both meter constant, regulated flow of fluids while being capable of rapidly injecting large quantities of fluid, such as would be required to kill a well.

Therefore, it is an object of the invention to provide a chemical injection valve which will provide a constant, metered flow of fluid.

It is a further object to provide a chemical injection valve that will permit a large flow of injected fluid therethrough.

Another object is to provide a chemical injection valve having a constant back pressure operating to resist flow of fluid through the valve.

Yet another object is to provide a chemical injection valve that does not have a metal to metal valve and seat arrangement.

It is a further object of the invention to provide a chemical injection valve having a close fit spool and cylinder valve arrangement without seals for metering injection fluids.

The above and other objects and features of the invention will be apparent to those skilled in the art after a consideration of the following detailed description taken in conjunction with the accompanying drawings in which a preferred embodiment of the invention is shown.

BRIEF DESCRIPTION OF THE DRAWINGS

FIG. 3 is a partially cut away elevational view of a portion of a well tubing string having a tubing mandrel connected therein with an externally mounted injection valve.

FIG. 4 is a partially cut away elevational view of a portion of a well tubing string having a side pocket mandrel connected therein and having one embodiment of the invention received therein.

FIG. 5 is a quarter sectional view of one embodiment of the invention, adapted for placement in a side pocket mandrel.

DESCRIPTION OF THE PREFERRED EMBODIMENTS

Figure 1:
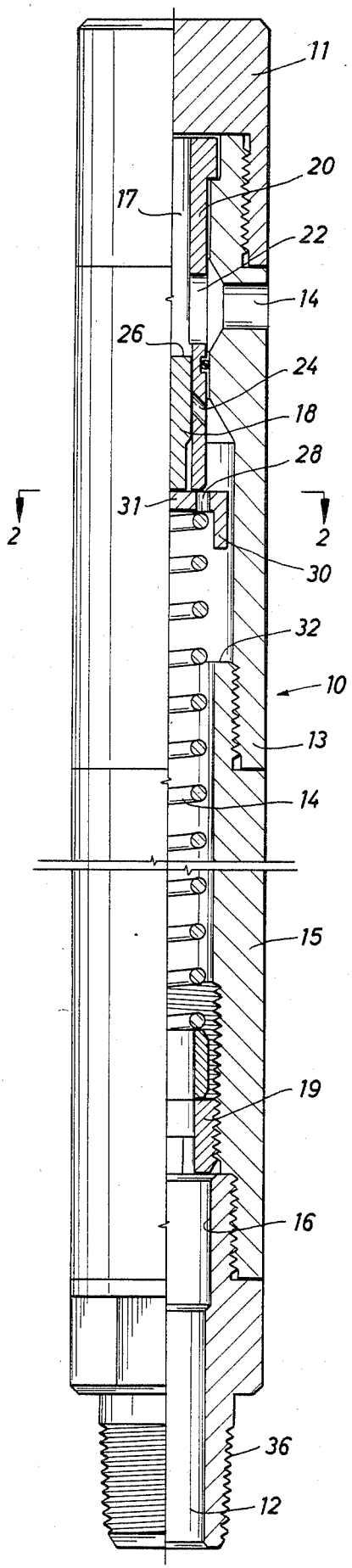
FIG. 1 is a quarter sectional view of the chemical injection valve of the invention, showing the valve in the closed position.

Referring first to FIG. 1, the embodiment of the chemical injection valve 10 illustrated is designed for installation on the Type B conventional gas lift mandrel, such as manufactured by Otis Engineering Corporation. The Type B mandrel is illustrated in their catalogue OEC-5122B on page 28. The mandrel 42 is made up in the tubing string 44 with the chemical injection valve 10 mounted as shown in FIG. 3.

The chemical injection valve 10 may include any suitable housing. The preferred form for external mounting includes a tubular housing 13 and 15 having a longitudinal bore 16 with at least one open end 12. While the tubular housing 13 and 15 shown in FIG. 1 has two separate threaded members 13 and 15, it is possible to have only a single tubular member.

Some means should be provided on the housing 13 and 15 for securing the chemical injection valve 10 to a mandrel. Preferably, there is provided suitable threads 36 or other means on the tubular housing 15 for securing the injection valve 10 to the gas lift mandrel 42, as illustrated in FIG. 3. This illustration demonstrates installation of the chemical injection valve 10 in a well.

There is shown a casing 38 set in a typical well, with production tubing 44 run in the well with a Type B conventional gas lift mandrel 42 connected in the tubing string 44. In most chemical treatments and hot oil injection, the treating fluid is added to the tubing-casing annulus 39. The annulus 39 is pressured up by methods well known in the industry. The treating fluids entering the chemical injection valve are metered into the tubing bore 46, as previously described, passing through mandrel ports 48, as shown in the drawings and illustrated in the Otis Engineering Catalogue referred to above.

FIG. 4 illustrates an inside mounted embodiment of the chemical injection valve. The side pocket mandrel 50 illustrated is manufactured and sold by Otis Engineering Corporation. The mandrel 50 is shown and described in their catalogue OEC-5122b, page 34, along with the kickover tool useful for setting the chemical injection valve 52 in the mandrel 50.

Referring again to FIG. 1, there is provided a variable volume chamber 17 within a portion of the housing 13. The chamber 17 is preferably confined within the housing 13 by a cap member 11 connected to the housing 13. Means are provided for admitting fluids from the exterior of the injection valve to the interior of the variable volume chamber 17. This is preferably accomplished by providing a lateral housing port 14 which extends through the tubular housing 13 and terminates at the chamber 17.

The injection valve 10 of the invention is capable of very accurately metering small quantities of liquids from the tubing-casing annulus into the tubing string. At the same time, the injection valve is capable of passing enough fluid in a short enough period of time to kill the well. Remarkably, these things can be accomplished by providing a close fit metering member 18 mounted within a valve sleeve 20. The metering member 18 is biased to resist the pressure of fluids entering th variable volume chamber 17, with at least one surface 26 of the metering member forming one wall of the chamber 17.

The valve sleeve 20 is preferably provided with at least two tandem orifices 22 and 24. When the metering member 18 is fully seated within the valve sleeve 20, at least one of the orifices 24 is closed to fluid flow. The other orifice 22 provides continuous fluid access from the exterior of the tubular housing 13 to the chamber 17. As fluid under pressure enters the chamber 17, through the fluid access orifice 22, the fluid pressure acts on metering member surface 26 to overcome the biase resistance. If the pressure is sufficient, the metering member commences to open the metering orifice 24, which permits the fluid entering the chamber to bypass the metering member and traverse the bore 16 of the tubular housing, exiting through the open end 12 of the injection valve 10.

The metering member 18 is preferably provided with suitable biasing means 14, which can be adjusted to provide a known resistance to fluid pressure anticipated to be entering the chamber 17. The biasing means 14 is shown in the drawings to be a suitable spring disposed within the bore of the tubular housing 13 and 15. The rate of the spring 14 may be adjusted by providing some means 19 to compress the spring 14. Preferably, such adjustment means is disposed in the tubular housing 15 and has means in contact with the spring 14 for adjusting the overall height of the spring 14. In the drawing, a threaded member 19, is in contact with one end of the spring 14, may be adjusted to compress the spring 14.

Figure 2:
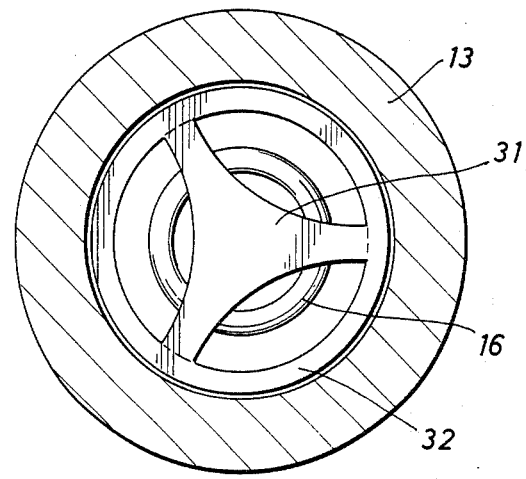
FIG. 2 is a cross-sectional view of the valve of FIG. 1, taken along line 2—2.
Figure 2A:
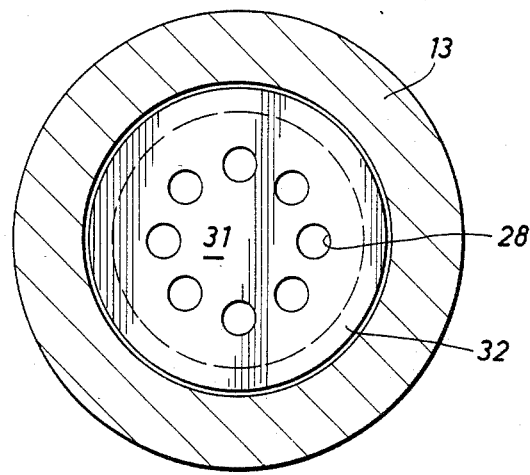
FIG. 2A is a cross-sectional view of the valve of FIG. 1, taken along line 2—2.

Preferably, one end of the biasing means 14 is in contact with a portion of the metering member 18. As illustrated in FIG. 1, the spring 14 is placed beneath a lower portion 31 of the metering member 18. The lower member 31 of this embodiment is provided with some means 28 for allowing the fluid traversing the metering orifice 24 to pass through the lower portion 31 of the metering member 18. FIGS. 2 and 2A illustrate two possible means 28 for flowing fluids through the lower member 31. A plurality of orifices 28 can be provided or the lower member 31 can be specially shaped, as shown in FIG. 2.

It has been found that, depending upon the range of metering rates desired by the operator, any number of orifices 22 and 24 may be used successfully. However, an important aspect of the invention has been found to be the ability of the metering member 18 to uncover just fractions of the metering orifice without experiencing unwanted oscillation of the metering member 18. This can be done by applying pressure to the tubing-casing annulus. The spring bias 14 prevents the treating fluid from flowing into the well solely as a consequence of its greater density in comparison to the well fluids. Thus, the rate of flow through the injection valve is controlled essentially only by changes in pressure applied to the tubing-casing annulus.

It is further noted that no special seals are used to seal between the metering member 18 and the wall of the sleeve member 20. Rather, it has been found that the snug fit of these two members provides sufficient sealing action to properly meter fluids entering the chamber 17.

In the embodiment illustrated in FIG. 1 the metering member 18 has means 30 thereon, which interacts with an inwardly projecting shoulder 32 on the tubular housing 15, to provide a limit on downward travel of the biased metering valve member 18. It is to be understood that various other means may be used in combination for this purpose. A stop shoulder could as easily be provided to interact with a shoulder or other limiting means on the sleeve member 20, thus allowing the tubular housing to be a single, uniform tube. Such configuration would greatly simplify machining requirements in assembly of the chemical injection valve 10.

In the embodiment shown in FIG. 4, treating fluid must enter mandrel ports 54 to have access to the injection valve 52. The entering treating fluid is confined between housing seal means 62 and 64, which provide a seal against the walls of the side pocket within the mandrel 50. Thus, fluid is forced into a housing fluid entry port 56, is metered through the injection valve 52, as hereinafter described, and passes through pocket exit ports 60 into the bore 58 of the mandrel 50 and tubing 44.

As seen in FIG. 5, the internal assembly of this embodiment of the invention is essentially identical with the outside mounted injection valve 10 shown in FIG. 1. The inside mounted injection valve 70 has a tubular housing 72 and 73, having a longitudinal bore 74. There is provided a lower housing member 79 having treating fluid exit means 78. For practical purposes, the exit means 78 can be ports as illustrated in FIG. 5, or other suitable openings as may be suitable for specific side pocket mandrels used in the industry.

Port means 76 is provided through the tubular housing 72, providing access for treating fluids to a variable volume chamber 77 in the upper portion of housing bore 74. The upper end of the tubular housing 70 is closed off by a suitable cap 80 or other closure means. The cap 80 is provided with suitable means 81 such as a threaded boss for attachment to a kickover tool for setting and retrieving the injection valve 70.

External sealing means 82 and 84 are provided on the housing for sealing the injection valve 70 in the side pocket of the mandrel, as shown in FIG. 4. The sealing means 82 and 84 are positioned above and below the treating fluid entry port 76, so that treating fluid entering the side pocket is directed into the injection valve through the entry port 76.

A tubular sleeve 86 is positioned within the upper portion of the bore 74 of the tubular housing 22. Snugly received in a portion of the sleeve member 86 is a slidably movable biased metering member 90.

The sleeve member 86 has one or more lateral fluid entry ports 88 to provide treating fluid entering entry port 76 access to the chamber 77. There is additionally provided one or more fluid by-pass metering ports 94 in the sleeve member 86, set beneath the sleeve fluid entry ports 88.

Movement of the biased valve member 90 in a downward direction opens the metering port 94, allowing treating fluid in the chamber 77 to pass into the tubular housing bore 74 and thence through the fluid exit means 78.

It is preferred that suitable sealing means 93 be positioned between the sleeve member 86 and the housing bore wall to confine treating fluid within the chamber 77 until the downward travel of the metering member 90 permits fluid exit through the metering port 94.

It should be recognized by those skilled in the art that other means can be provided for receiving the metering member 90 and for providing a by-pass, such as the metering port 94. The tubular housing 72 can be machined to receive the valve member 90 and passageways drilled in the tubular housing 72 to provide a fluid bypass means. The assembly shown is, therefore, but one possible embodiment of the invention, for both the outside and inside mounted injection valves.

The valve member 90 is biased by a suitable resilient urging means, shown in FIG. 5 to be a spring 92 having a preselected spring force. Springs of varying force can be used, in all embodiments of the invention, depending on the pressure requirements of each particular well installation in which the injection valves will be used. Preferably, the spring can be shortened by suitable adjustment means.

While the spring 92 provides suitable preselected biasing of the metering member 90, working against pressure of fluid in the chamber 77, it is preferred to have some means to limit downward travel of the metering member 90. Therefore, in the embodiment shown, a lower stop member 98 is provided on the metering member 90 which when forced downward contacts a stop shoulder 99 extending from the tubular housing member 73 into the bore 74. The metering member 90 has a piston surface 91 in communication with the upper chamber 77, against which the fluid pressure in chamber 77 acts to move the biased valve member 90 in a downward direction.

It is seen that the valve member 90 has suitable fluid passageways 96 for treating fluid, exiting the metering ports 94, to pass through the lower portion of the valve member 90 into the housing bore 74. Suitable configurations of the lower portion of the metering member 90 are shown in FIGS. 2 and 2A.

It will be understood by those skilled in the art that modifications to parts of the invention can be made without departing from the full scope of the invention, which is claimed hereinafter. It has been found that the present invention provides constant back pressure due to the spring force resisting fluid pressure pushing down on the valve member. This has been found to provide a more uniform metering of treating fluids into the well. In addition, the injection valve provides a flow capacity for large fast flows of hot oil and kill fluids without serious injury to the valve member.

What is claimed is:

1. A valve for use in injecting fluid from an annulus about a tubing string into the bore of the tubing string, wherein the tubing string includes a mandrel having means to one side of the bore for receiving the valve, said valve comprising
   an elongate single wall housing which is essentially tubular from end to end having,
   inlet means to interior of the housing at one end thereof, outlet means from the interior of the housing at the other end thereof, and
   means cooperable with the mandrel, where so received, to open the inlet means to the annulus and the outlet means to the bore of the tubing,
   a sleeve fixedly mounted within the housing near its one end,
   means sealing between the sleeve and inner surface of the housing,
   ports in the sleeve having outer ends connecting with a substantially unobstructed annular space between the sleeve and the inner surface of the housing which opens to an open chamber within the inner surface of the housing leading to the outlet means,
   an impervious metering member fitting snugly within the sleeve for reciprocation between positions opening and closing the inner end of the ports, and
   the one end of the housing being closed to form a variable volume chamber with the metering member, the inlet means comprising ports in the housing and the sleeve for connecting the annulus with the chamber
   a coil spring within the open chamber and fitting relatively closely within the inner surface of the housing for urging said metering member toward closing position.

2. The valve of claim 1, including
   a part extending laterally of the metering member and against which the spring acts to urge the member to closed position.

3. The valve of claim 2, wherein said part is engageable with the sleeve to limit the extent to which the spring urges the metering member to closed position.

4. The valve of claim 2, wherein the housing has an upwardly facing shoulder on its inner surface which is engaged by the outer periphery of the part to limit downward movement of the metering member substantially beyond its open position.

5. The valve of claim 3, wherein the housing has an upwardly facing shoulder on its inner surface which is engaged by the outer periphery of the part to limit downward movement of the metering member substantially beyond its open position.

* * * * *

UNITED STATES PATENT AND TRADEMARK OFFICE
CERTIFICATE OF CORRECTION

PATENT NO. : 4,565,215

DATED : January 21, 1986

INVENTOR(S) : Leslie L. Cummings

It is certified that error appears in the above-identified patent and that said Letters Patent is hereby corrected as shown below:

On the title page, the following should be added:

--[73]  Assignee:   Otis Engineering Corporation
                    Dallas, TX. --.

Signed and Sealed this

Eleventh Day of July, 1989

*Attest:*

DONALD J. QUIGG

*Attesting Officer*   *Commissioner of Patents and Trademarks*